(12) United States Patent
Yoshida

(10) Patent No.: US 10,268,933 B2
(45) Date of Patent: Apr. 23, 2019

(54) SHEET CONVEYANCE APPARATUS THAT ENSURES REDUCED NOISE, AND IMAGE FORMING APPARATUS INCLUDING THE SAME

(71) Applicant: Kyocera Document Solutions Inc., Osaka (JP)

(72) Inventor: Takeshi Yoshida, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 80 days.

(21) Appl. No.: 15/689,130

(22) Filed: Aug. 29, 2017

(65) Prior Publication Data

US 2018/0060707 A1    Mar. 1, 2018

(30) Foreign Application Priority Data

Aug. 29, 2016   (JP) ................................ 2016-166777

(51) Int. Cl.
| | | |
|---|---|---|
| *G06K 15/14* | (2006.01) | |
| *B65H 5/06* | (2006.01) | |
| *B65H 29/20* | (2006.01) | |
| *B65H 29/70* | (2006.01) | |

(52) U.S. Cl.
CPC ............ *G06K 15/14* (2013.01); *B65H 5/062* (2013.01); *B65H 5/068* (2013.01); *B65H 29/20* (2013.01); *B65H 29/70* (2013.01); *B65H 2404/10* (2013.01); *B65H 2801/06* (2013.01)

(58) Field of Classification Search
CPC ...................................................... G06K 15/14
USPC ........................................................ 399/401
See application file for complete search history.

(56) References Cited

U.S. PATENT DOCUMENTS

| | | | | |
|---|---|---|---|---|
| 4,766,467 A | * | 8/1988 | Yamada ............... | G03G 15/234 271/3.08 |
| 2009/0110459 A1 | * | 4/2009 | Honda ............... | G03G 15/6552 399/405 |
| 2011/0115148 A1 | * | 5/2011 | Nakaishi ............. | B65H 29/125 271/109 |
| 2012/0181744 A1 | * | 7/2012 | Suzuki .................. | B65H 5/062 271/243 |
| 2014/0027975 A1 | * | 1/2014 | Mizuno ................ | B65H 85/00 271/225 |

(Continued)

FOREIGN PATENT DOCUMENTS

JP    H10-198207 A    7/1998

*Primary Examiner* — Anthony H Nguyen
(74) *Attorney, Agent, or Firm* — HEA Law PLLC

(57) ABSTRACT

A sheet conveyance apparatus includes an inner main unit, a guiding portion, a conveyance roller pair, a mounting portion, and an urging member. A pair of bearing portions supports a shaft portion of a driven roller. A supporting portion is located on an upstream side or a downstream side in a conveyance direction in the pair of bearing portions and supports a pair of extending portions from below. A pressing portion abuts on the pair of extending portions, from above, between the pair of bearing portions and the supporting portion to elastically deform the pair of extending portions. A regulating portion is located between the pair of bearing portions and the supporting portion in the conveyance direction and regulates an interval between the pair of extending portions such that the interval becomes wider than a length of a roller portion in a width direction.

5 Claims, 8 Drawing Sheets

(56) References Cited

U.S. PATENT DOCUMENTS

2014/0110896 A1* 4/2014 Ishikawa ................ B65H 29/52
 271/3.18
2015/0115519 A1* 4/2015 Takezawa ............ B65H 3/0669
 271/117
2015/0253715 A1* 9/2015 Tobinaga ............. G03G 15/231
 399/405

* cited by examiner

Conveyance Direction of Sheet

SHEET CONVEYANCE APPARATUS THAT ENSURES REDUCED NOISE, AND IMAGE FORMING APPARATUS INCLUDING THE SAME

INCORPORATION BY REFERENCE

This application is based upon, and claims the benefit of priority from, corresponding Japanese Patent Application No. 2016-166777, filed in the Japan Patent Office on Aug. 29, 2016, the entire contents of which are incorporated herein by reference.

BACKGROUND

Unless otherwise indicated herein, the description in this section is not prior art to the claims in this application and is not admitted to be prior art by inclusion in this section.

There is known a following sheet conveyance apparatus as a typical sheet conveyance apparatus that is located in an apparatus main body of an image forming apparatus and conveys a sheet.

There is proposed a sheet conveyance apparatus that a drive roller, which is rotatably driven, and a driven roller, which is driven by the drive roller so as to rotate, sandwich a sheet to convey the sheet in a predetermined conveyance direction. The driven roller is held by a holding member, which is integrally formed with a leaf spring. The holding member includes a pair of extending portions extending along both end surfaces of the driven roller from the leaf spring, and rotatably supports a pair of shaft portions projecting from both the end surfaces of the driven roller at the extending portions. Furthermore, the holding member urges the driven roller toward the drive roller using an elastic force of the leaf spring.

However, the holding member includes the pair of extending portions, which extends along both the end surfaces of the driven roller, possibly causing the extending portions to contact side surfaces of the driven roller because of vibrations of the driven roller or a force from outside. Thus, in the above-described sheet conveyance apparatus, the contact between the driven roller and the holding member may generate a large noise.

SUMMARY

A sheet conveyance apparatus according to one aspect of the disclosure includes an inner main unit, a guiding portion, a conveyance roller pair, a mounting portion, and an urging member. The guiding portion is located opposed to the inner main unit and forms a conveyance path for sheets. The conveyance roller pair includes a drive roller and a driven roller. The driven roller is driven by the drive roller to rotate. The conveyance roller pair contacts a sheet and rotating to convey the sheet. The mounting portion is located in the guiding portion. The driven roller is mounted to the mounting portion. The urging member is located in the mounting portion. The urging member urges the driven roller toward the drive roller. The driven roller includes a roller portion and a shaft portion. The roller portion contacts the sheet. The shaft portion projects from both end surfaces of the roller portion. The urging member is an approximately U-shaped linear member and includes a pair of extending portions and a base end portion. The pair of extending portions extends in a conveyance direction of the sheet and abutting on the shaft portion. The base end portion connects end portions of the pair of extending portions. The mounting portion includes a pair of bearing portions, a supporting portion, a pressing portion, and a regulating portion. The pair of bearing portions supports the shaft portion of the driven roller. The supporting portion is located on an upstream side or a downstream side in the conveyance direction in the pair of bearing portions and supports the pair of extending portions from below. The pressing portion abuts on the pair of extending portions, from above, between the pair of bearing portions and the supporting portion to elastically deform the pair of extending portions. The regulating portion is located between the pair of bearing portions and the supporting portion in the conveyance direction and regulates an interval between the pair of extending portions such that the interval becomes wider than a length of the roller portion in a width direction.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
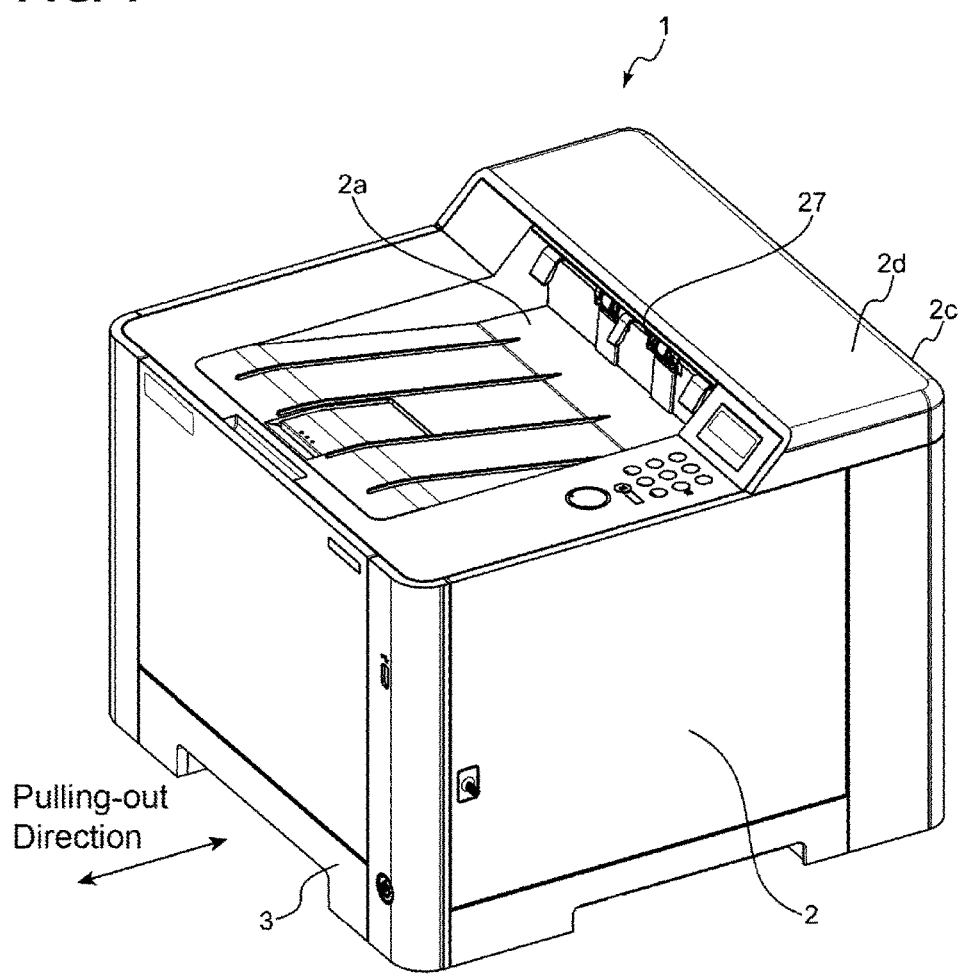
FIG. 1 obliquely illustrates an image forming apparatus including a sheet conveyance apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 2:
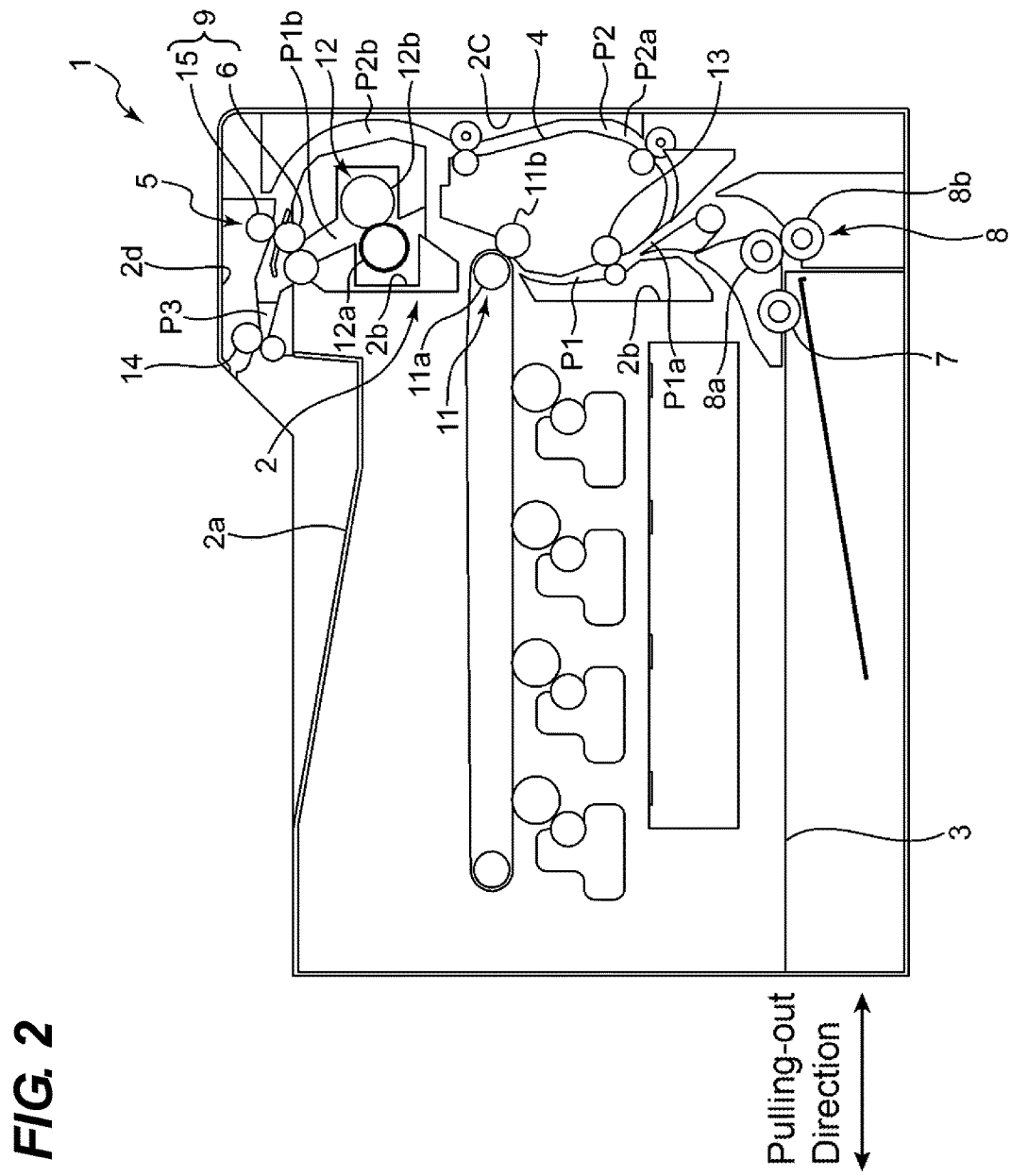
FIG. 2 schematically illustrates the image forming apparatus including the sheet conveyance apparatus according to the one embodiment.
Figure 3:
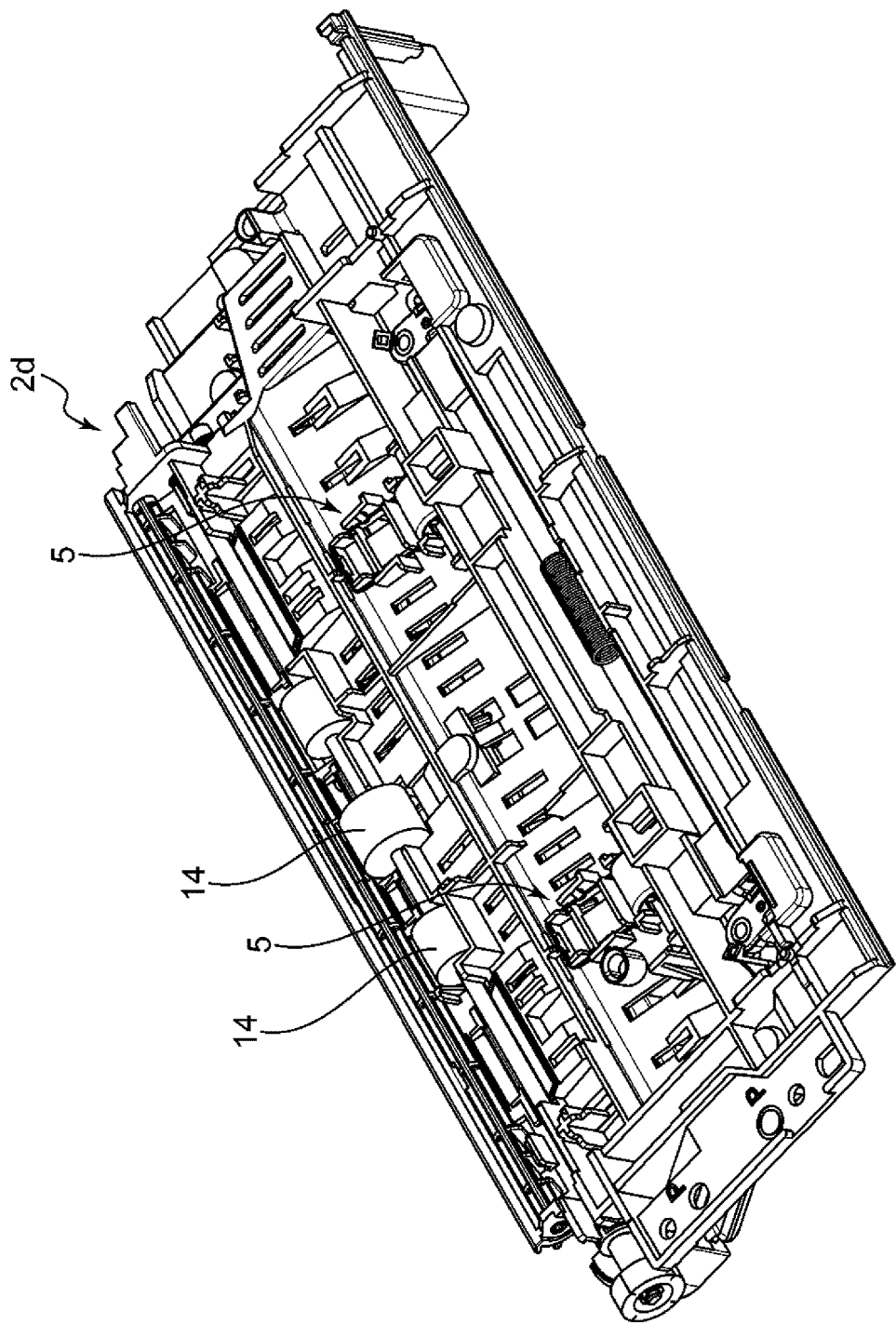
FIG. 3 obliquely illustrates a mounting portion of the sheet conveyance apparatus according to the one embodiment.

FIG. 1 obliquely illustrates an image forming apparatus 1 including an exemplary sheet conveyance apparatus. FIG. 2 schematically illustrates the image forming apparatus 1 including the exemplary sheet conveyance apparatus. FIG. 3 obliquely illustrates a mounting portion 2*d* of the image forming apparatus 1 including the sheet conveyance apparatus. The image forming apparatus 1 includes an image forming unit 11 (described later) that forms an image in accordance with a document image of a sheet and is a printer having a duplex printing function that enables images to be printed on both sides of a sheet. This image forming apparatus 1 is also employed for a copier and a facsimile. The image forming apparatus 1 includes an approximately cube-shaped apparatus main body 2, a sheet conveyance apparatus 5, a sheet feed cassette 3, and a conveyance guide 4. The apparatus main body 2 houses various devices. The sheet conveyance apparatus 5 is located in the apparatus main body 2. The sheet feed cassette 3 houses a sheet bundle. The conveyance guide 4 forms a conveyance path for conveyance for sheets.

The apparatus main body 2 includes a sheet discharge tray 2*a*, an inner main unit 2*b*, a guiding portion 2*c*, and the mounting portion 2*d*. The sheet discharge tray 2*a* is located in an upper portion of the apparatus main body 2. The inner main unit 2*b* constitutes an inside of the apparatus main body 2. The guiding portion 2*c* forms a sheet conveyance path with the conveyance guide 4. The mounting portion 2*d* is mounted in an upper portion of the guiding portion 2*c*. The inner main unit 2*b* forms an upstream portion P1*a* in a conveyance direction of the sheet in a first conveyance path P1 where the sheet supplied from the sheet feed cassette 3 is conveyed with the conveyance guide 4. The inner main unit 2*b* forms a downstream portion P1*b* in the conveyance direction of the sheet in the first conveyance path P1. The inner main unit 2*b* forms a discharge conveyance path P3 with the mounting portion 2*d*.

The first conveyance path P1 is formed extending in a vertical direction from near a lower portion of the apparatus main body 2 to near the upper portion. The downstream portion P1*b* of the first conveyance path P1 is connected to the discharge conveyance path P3. The discharge conveyance path P3 has a downstream end where a discharge inverting port 27 that opens toward the sheet discharge tray 2*a* is formed.

The guiding portion 2*c* is located so as to cover the conveyance guide 4. The guiding portion 2*c* forms a downstream portion P2*a* in a conveyance direction of the sheet in the second conveyance path P2 with the conveyance guide 4. The guiding portion 2*c* forms an upstream portion P2*b* in the conveyance direction of the sheet in the second conveyance path P2 with the inner main unit 2*b*. The second conveyance path P2 is formed extending in the vertical direction from near the upper portion of the apparatus main body 2 to near a middle portion. The second conveyance path P2 is connected to the discharge conveyance path P3 in the upstream portion P2*b* and is joined to the first conveyance path P1 in the downstream portion P2*a*. The second conveyance path P2 is a conveyance path to which the sheet switched back in the discharge conveyance path P3 is supplied.

The sheet feed cassette 3 is mounted in the lower portion of the apparatus main body 2. The sheet feed cassette 3 is removable from the apparatus main body 2. The sheet feed cassette 3 can be pulled out from a front surface side of the apparatus main body 2 so as to house a sheet by hand. In the proximity of an upper right of the sheet feed cassette 3, a pickup roller 7 and a feed roller pair 8 are located. The pickup roller 7 feeds a sheet at the uppermost layer of the sheet bundle one by one. The feed roller pair 8 conveys the sheet to an upper stream end in the conveyance direction of the sheet in the first conveyance path P1. The feed roller pair 8 is constituted of a feed roller 8*a* and a retard roller 8*b* that handles and conveys the sheets one by one along with the feed roller 8*a*.

The conveyance guide 4 is mounted to the inner main unit 2*b* and swingable around its lower end as a fulcrum. The conveyance guide 4 is removable from the inner main unit 2*b*. An operator opens the guiding portion 2*c* on a side surface of the apparatus main body 2 during a jam process, thus ensuring the exposed second conveyance path P2. The operator further swings the conveyance guide 4, thus ensuring the exposed first conveyance path P1.

At an approximately intermediate position in the conveyance direction of the sheet in the first conveyance path P1, the image forming unit 11, which forms an image on a sheet, is located. The image forming unit 11 includes a photoreceptor drum 11*a*, which is located in the inner main unit 2*b*, and a transfer roller 11*b*, which is located in the conveyance guide 4. The photoreceptor drum 11*a* and the transfer roller 11*b* face one another in the first conveyance path P1. The photoreceptor drum 11*a* has a circumference surface that includes a photosensitive layer on which an electrostatic latent image and a toner image are formed. The transfer roller 11*b* forms a transfer nip portion with the photoreceptor drum 11*a*. The transfer roller 11*b* transfers the toner image on the photoreceptor drum 11 *a* onto the sheet.

A fixing unit 12 is located on a downstream side in the conveyance direction of the sheet with respect to a position of the image forming unit 11 in the first conveyance path P1. The fixing unit 12 includes a fixing roller 12*a*, which includes a heat source, and a pressure roller 12*b*, which forms a fixing nip portion along with the fixing roller 12*a* in the first conveyance path P1. Both the fixing roller 12*a* and the pressure roller 12*b* are located in the inner main unit 2*b*. The fixing unit 12 applies heat and pressure to the sheet, on which the toner image is transferred in the image forming unit 11, at the fixing nip portion to perform a fixing process.

A registration roller pair 13 is located on an upstream side in the conveyance direction of the sheet with respect to the position of the image forming unit 11 in the first conveyance path P1. The registration roller pair 13 conveys the sheet to the transfer nip portion at a predetermined timing.

The discharge conveyance path P3 has the downstream end where a discharge inverting roller pair 14 is located. The discharge inverting roller pair 14 conveys the sheet, on which the image is formed, to the sheet discharge tray 2*a*.

Figure 4:
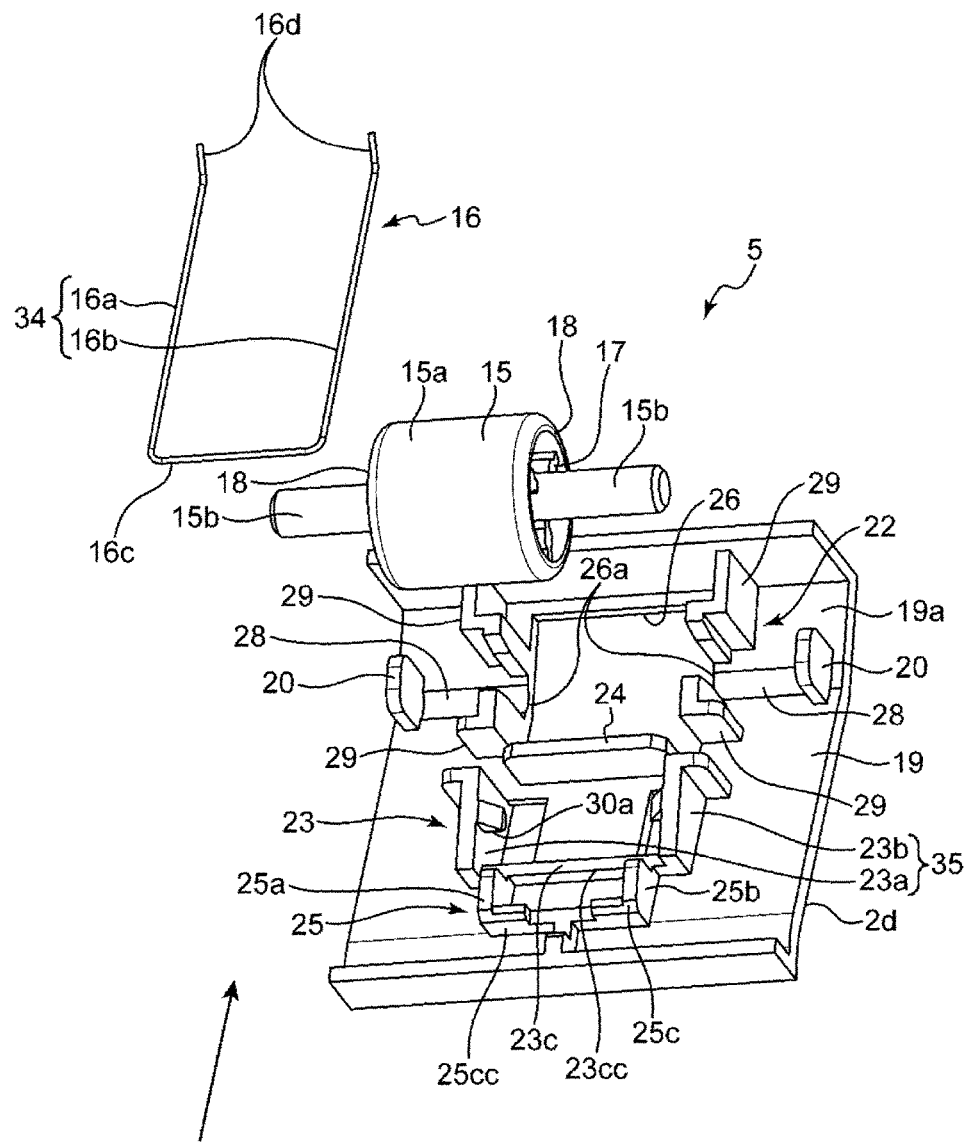
FIG. 4 presents an exploded perspective view illustrating components of the sheet conveyance apparatus according to the one embodiment.
Figure 5:
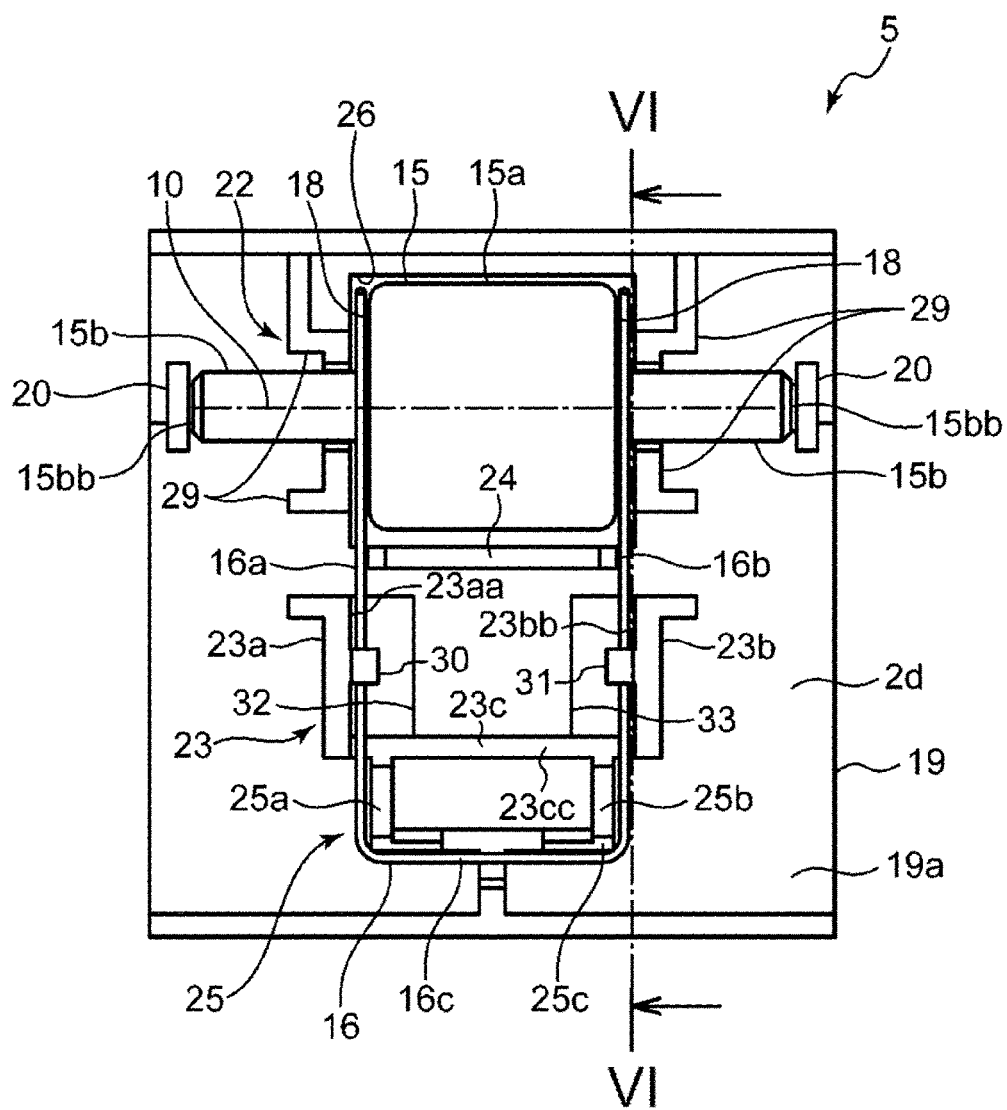
FIG. 5 illustrates a plan view illustrating the sheet conveyance apparatus according to the one embodiment.
Figure 6:
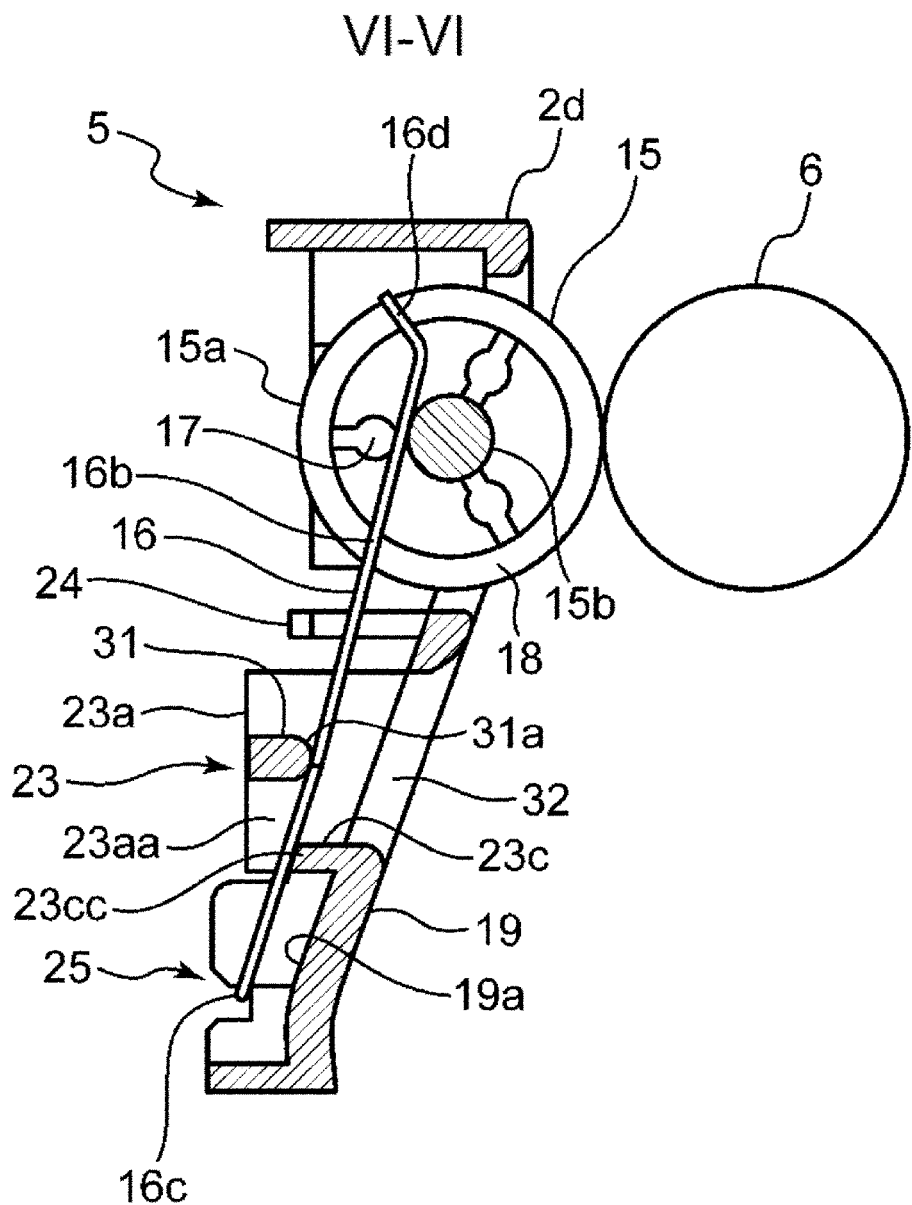
FIG. 6 illustrates a cross section taken along the line VI-VI in FIG. 5.

FIG. 4 presents an exploded perspective view illustrating components of the exemplary sheet conveyance apparatus 5. FIG. 5 illustrates a plan view illustrating the exemplary sheet conveyance apparatus 5 of the image forming apparatus 1. FIG. 6 illustrates a cross section taken along the line VI-VI in FIG. 5. The sheet conveyance apparatus 5 includes the guiding portion 2*c*, the mounting portion 2*d*, a conveyance roller pair 9, and an urging member 16. The conveyance roller pair 9 is constituted of a drive roller 6 and a driven roller 15. The urging member 16 urges the driven roller 15 toward the drive roller 6.

The drive roller 6 is located at the proximity of the discharge conveyance path P3 in the inner main unit 2*b* (see FIG. 2). The drive roller 6 is rotatably located in the inner main unit 2*b* and rotatably driven by a motor (not illustrated). The drive roller 6 forms a nip that sandwiches the sheet with the driven roller 15 to convey the sheet, which is reversely conveyed at the discharge inverting roller pair 14.

The driven roller 15 includes a cylindrically-shaped roller portion 15*a* and a shaft portion 15*b*. The roller portion 15*a* contacts the sheet. The shaft portion 15*b* rotatably supports the roller portion 15*a*. The driven roller 15 is driven by the drive roller 6, so as to rotate. The shaft portion 15b is inserted into the roller portion 15a and projects from both end surfaces 18 and 18 of the roller portion 15a (see FIG. 4). The shaft portion 15b is connected to three supporting portions 17 projecting from an inner surface of the roller portion 15a in an inner diameter direction (see FIG. 4). Thus, the driven roller 15 is configured to integrally rotate the roller portion 15a and the shaft portion 15b about an axial center 10.

The mounting portion 2d includes a plate-shaped base plate 19, a pair of shaft regulating plates 20, a pair of bearing portions 22, a supporting portion 23c, a pressing portion 23, a regulating portion 24, and a mounting portion 25 (see FIGS. 4 and 5). The pair of shaft regulating plates 20 regulates a position in a shaft direction of the driven roller 15. The pair of bearing portions 22 is constituted of support walls 29, which are located opposed to the conveyance direction of the sheet. The supporting portion 23c supports the urging member 16, which includes a pair of extending portions 34, from below. The pressing portion 23 abuts on the urging member 16 from above to elastically deforms it. The regulating portion 24 regulates a position of the urging member 16 in the shaft direction of the shaft portion 15b. The mounting portion 25 regulates a position of the urging member 16 in the conveyance direction of the sheet.

The base plate 19 includes an approximately-square shaped first opening 26, to which the roller portion 15a is fitted, and arc-shaped two fitted grooves 28 and 28, to which the shaft portion 15b is fitted. The first opening 26 is located on the base plate 19 on the downstream side in the conveyance direction of the sheet. The fitted grooves 28 and 28 are formed extending from both side edges 26a and 26a of the first opening 26, which are located in a right-angle direction with respect to the conveyance direction of the sheet, and extending in the right angle direction.

The pair of shaft regulating plates 20 projects from a base surface 19a of the base plate 19 at positions adjacent to edges in the right angle direction of both the fitted grooves 28 and 28. Thus, the pair of shaft regulating plates 20 is configured to contact end surfaces 15bb of the shaft portion 15b when the shaft portion 15b is fitted to the fitted grooves 28 and 28. The pair of bearing portions 22 includes the four support walls 29 projecting from the base surface 19a of the base plate 19. The four support walls 29 are located at positions adjacent to the two fitted grooves 28 and 28 in the conveyance direction of the sheet, and positions adjacent to the first opening 26. Thus, when being fitted to the fitted grooves 28 and 28, the shaft portion 15b is supported by the pair of bearing portions 22, and then a position of the driven roller 15 in the conveyance direction of the sheet is regulated. The pair of bearing portions 22 may be located on the upstream side in the conveyance direction of the sheet when the driven roller 15 is located on the upstream side in the conveyance direction of the sheet.

The supporting portion 23c is located on the upstream side in the conveyance direction of the sheet at a distance from the pair of bearing portions 22. The supporting portion 23c projects from the base surface 19a of the base plate 19 and includes a support wall 23cc extending in a direction identical to the right-angle direction with respect to the conveyance direction of the sheet, that is, a width direction of the roller portion 15a.

The pressing portion 23 is located between the pair of bearing portions 22 (and the regulating portion 24) and the support wall 23cc in the conveyance direction. The pressing portion 23 projects from the base surface 19a of the base plate 19, and includes a pair of opposed wall portions 35, a first protruding portion 30, and a second protruding portion 31. The pair of opposed wall portions 35 is mutually opposed in the direction identical to the right angle direction with respect to the conveyance direction of the sheet, that is, the width direction of the roller portion 15a. The first protruding portion 30 and the second protruding portion 31 project from the respective pair of opposed wall portions 35. One opposed wall portion 23a extends in the conveyance direction of the sheet from one end of the support wall 23cc toward the driven roller 15. The other opposed wall portion 23b extends in the conveyance direction of the sheet from the other end of the support wall 23cc toward the driven roller 15. The first protruding portion 30 projects from the one opposed wall portion 23a toward the other opposed wall portion 23b at a position apart from the base surface 19a of the base plate 19. The second protruding portion 31 projects from the other opposed wall portion 23b toward the one opposed wall portion 23a at a position apart from the base surface 19a of the base plate 19. The pair of opposed wall portions 35 has a projection height higher than the support wall 23cc.

At a position adjacent to an opposed surface 23aa, which is opposed to the other opposed wall portion 23b, of the one opposed wall portion 23a, a rectangular shaped second opening 32, which is formed along the one opposed wall portion 23a, is formed on the base plate 19. At a position adjacent to an opposed surface 23bb, which is opposed to the one opposed wall portion 23a, of the other opposed wall portion 23b, a rectangular shaped third opening 33, which is formed along the other opposed wall portion 23b, is formed on the base plate 19.

The regulating portion 24 is a plate-shaped material formed in an approximately rectangular shape and is integrally formed with the base plate 19. The regulating portion 24 is located between the pair of bearing portions 22 and the pressing portion 23. The regulating portion 24 is located upright from the base surface 19a of the base plate 19 and extends in the direction identical to the right-angle direction with respect to the conveyance direction of the sheet, that is, the width direction of the roller portion 15a. A length of the regulating portion 24 in a width direction is formed slightly larger than a length of the roller portion 15a in the width direction, that is, a length between both the end surfaces 18 and 18 of the roller portion 15a. It is only necessary that the length of the regulating portion 24 in the width direction is equal to or more than the length between both the end surfaces 18 and 18 of the roller portion 15a. The length of the regulating portion 24 in the width direction is smaller than a length of the pair of opposed wall portions 35 in a width direction, that is, an interval between the opposed surface 23aa and the opposed surface 23bb.

The mounting portion 25 is located upright at a position adjacent to the support wall 23cc at the upstream side in the conveyance direction of the sheet. The mounting portion 25 includes a sidewall portion 25a, an opposed wall portion 25b, and an abutting portion 25c. The sidewall portion 25a is formed in an approximately C shape, is adjacent to one end portion of the support wall 23cc, and extends toward the upstream side in the conveyance direction of the sheet. The opposed wall portion 25b is adjacent to other end portion of the support wall 23cc, extends toward the upstream side in the conveyance direction of the sheet, and is opposed to the sidewall portion 25a. The abutting portion 25c connects the sidewall portion 25a to the opposed wall portion 25b. An interval between the sidewall portion 25a and the opposed wall portion 25b is narrower than an interval between the opposed wall portion 23a and the opposed wall portion 23b of the supporting portion 23c.

The urging member 16 is an approximately U-shaped linear member. The urging member 16 includes a pair of extending portions 34 (see FIG. 4) and a base end portion 16c. The pair of extending portions 34 extends in the conveyance direction of the sheet. The base end portion 16c connects end portions of the pair of extending portions 34. Furthermore, the urging member 16 includes bending portions 16d and 16d that are bend from distal ends of the pair of extending portions 34 toward a direction apart from the base plate 19 in a state where the urging member 16 is supported by the mounting portion 2d, that is, a direction opposite to an urging direction of the urging member 16.

One extending portion 16a of the pair of extending portions 34 is located between the base plate 19 and the first protruding portion 30. The one extending portion 16a contacts a projecting end of the support wall 23cc, an opposed surface 30a to the base surface 19a of the base plate 19 in the first protruding portion 30, and a side surface of the shaft portion 15b opposite to a side surface of a side on which the drive roller 6 is located. The other extending portion 16b of the pair of extending portions 34 is located between the base plate 19 and the second protruding portion 31. The other extending portion 16b contacts a projecting end of the support wall 23cc, an opposed surface 31a to the base surface 19a of the base plate 19 in the second protruding portion 31, and the side surface of the shaft portion 15b opposite to the side surface of the side on which the drive roller 6 is located. The base end portion 16c abuts on a side surface 25cc, which is located on the upstream side in the conveyance direction of the sheet in the abutting portion 25c.

The regulating portion 24 is located between the one extending portion 16a and the other extending portion 16b so as to contact both an inside of the one extending portion 16a and an inside of the other extending portion 16b. Thus, the one extending portion 16a and the other extending portion 16b receive a force of a direction apart from both the end surfaces 18 and 18 of the driven roller 15. As a result, an interval between the one extending portion 16a and the other extending portion 16b is regulated so as to be wider than the length between both the end surfaces 18 and 18 of the roller portion 15a. Therefore, the one extending portion 16a and the other extending portion 16b are less likely to contact both the end surfaces 18 and 18 of the driven roller 15, and generate a noise due to the contact between the urging member 16 and the driven roller 15.

The opposed surface 30a of the first protruding portion 30 includes an abutting portion (a first abutting portion) where the one extending portion 16a abuts, and this abutting portion is located on the drive roller 6 side with respect to a straight line connecting an abutting portion (a second abutting portion) where the one extending portion 16a abuts on the shaft portion 15b to an abutting portion (a third abutting portion) where the one extending portion 16a abuts on the support wall 23cc. The opposed surface 31a of the second protruding portion 31 includes an abutting portion where the other extending portion 16b abuts, and this abutting portion is located on the drive roller 6 side with respect to a straight line connecting an abutting portion where the other extending portion 16b abuts on the shaft portion 15b to an abutting portion where the other extending portion 16b abuts on the support wall 23cc. Thus, the urging member 16 receives a force of a direction apart from the base surface 19a of the base plate 19 from the support wall 23cc and receives a force of a direction toward the base surface 19a of the base plate 19, from the first protruding portion 30 and the second protruding portion 31. Therefore, the urging member 16 is bent toward the drive roller 6 side at a contact position of the first protruding portion 30 and the second protruding portion 31 and is supported by the mounting portion 2d while an elastic force to urge the driven roller 15 toward the drive roller 6 is applied. Consequently, the urging member 16 urges the driven roller 15 toward the drive roller 6 in a state where the pair of extending portions 34 contacts the shaft portion 15b.

Figure 7:
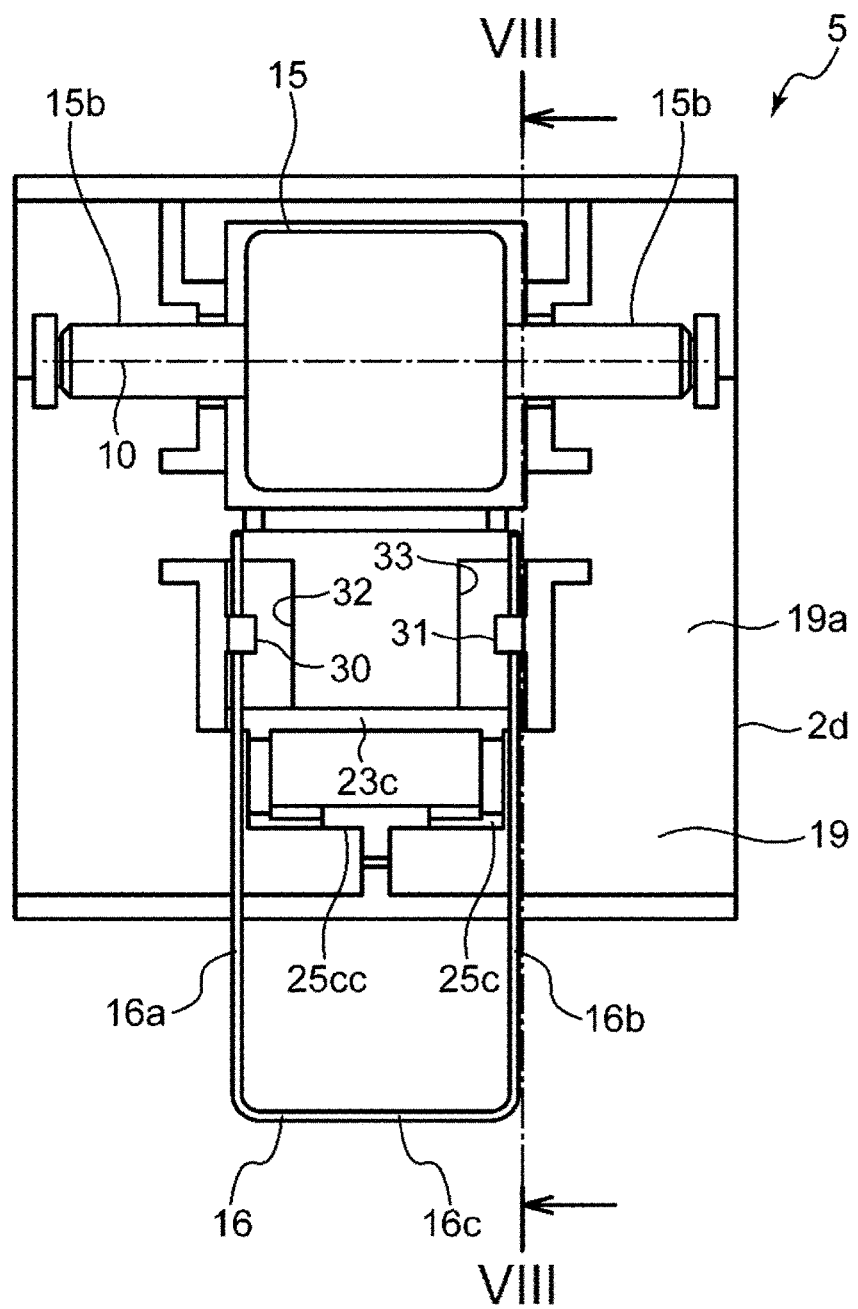
FIG. 7 illustrates a method for mounting an urging member of the sheet conveyance apparatus according to the one embodiment.
Figure 8:
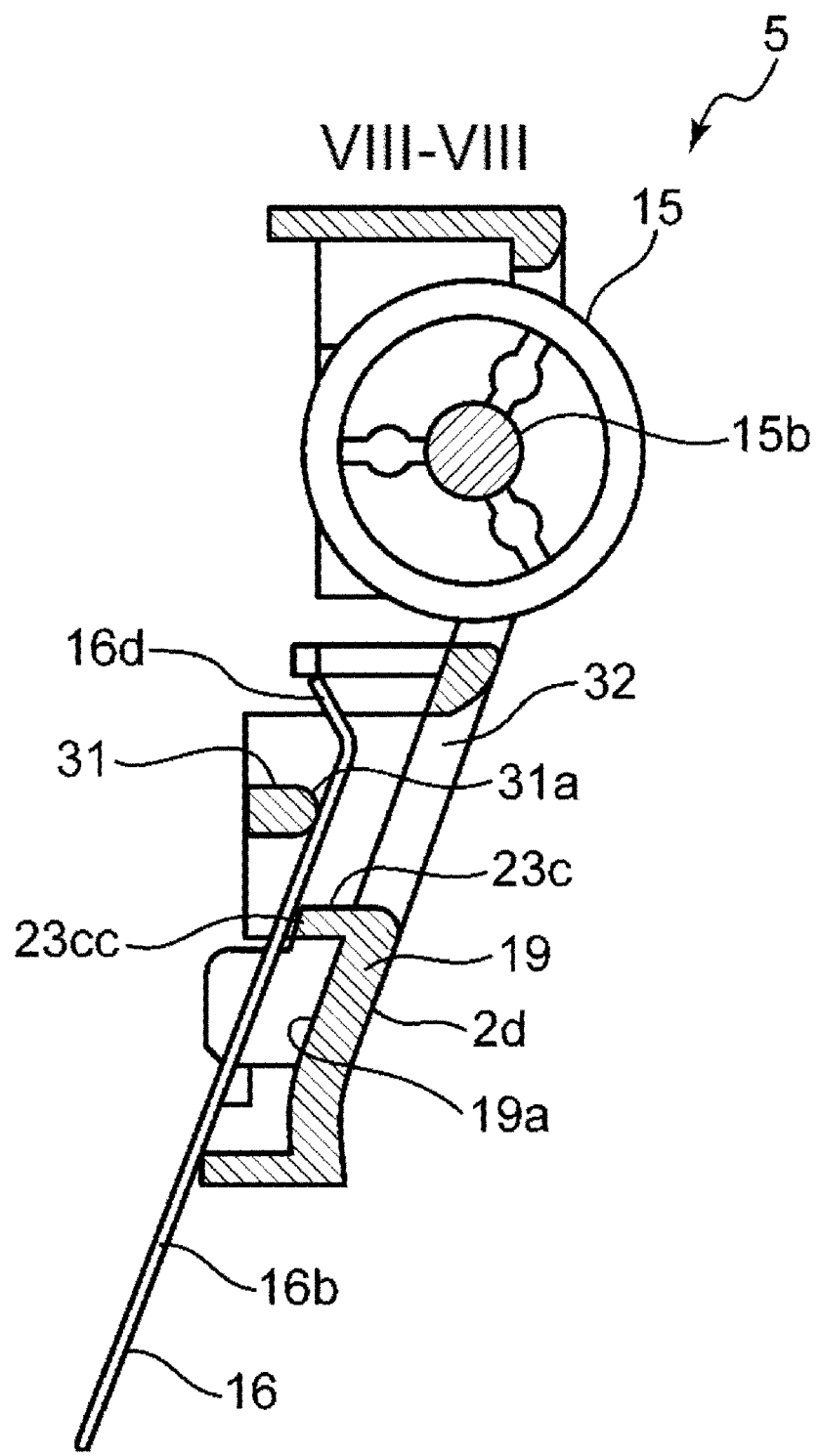
FIG. 8 illustrates a cross section taken along the line VIII-VIII in FIG. 7.

FIG. 7 illustrates a method for mounting the urging member 16 of the exemplary sheet conveyance apparatus 5. FIG. 8 illustrates a cross section taken along the line VIII-VIII in FIG. 7. In the image forming apparatus 1, which is configured as described above, the urging member 16 can be mounted to the mounting portion 2d as follows, for example.

First, the operator inserts the urging member 16 between the supporting portion 23c of the mounting portion 2d and the first and second protruding portion 30, 31 until the bending portions 16d reach the second opening 32 and the third opening 33 of the base plate 19. After that, the operator causes the urging member 16 to be approximately parallel to the base surface 19a of the base plate 19, so as to cause the pair of extending portions 34 to contact the projecting end of the support wall 23cc, and the opposed surfaces 30a and 31a of the first protruding portion 30 and the second protruding portion 31. Next, the urging member 16 is moved toward the downstream side in the conveyance direction of the sheet to cause the bending portions 16d to abut on the shaft portion 15b of the driven roller 15. From this state, the operator pushes the urging member 16 toward the downstream side in the conveyance direction of the sheet to cause the pair of extending portions 34 to contact the shaft portion 15b until the base end portion 16c contacts the side surface 25cc of the abutting portion 25c. At this time, the bending portions 16d bent toward the direction apart from the base plate 19 causes the pair of extending portions 34 to contact the side surface of the shaft portion 15b opposite to the side surface of the side on which the drive roller 6 is located, causing the bending portions 16d to easily slide the shaft portion 15b. This allows the operator to mount the urging member 16 to the mounting portion 2d smoothly.

While the urging member 16 is supported by the mounting portion 2d, which is mounted in the upper portion of the guiding portion 2c, a mounting position of the urging member 16 is not limited to the mounting portion 2d. When the urging member 16 is a mounting portion that supports the driven roller driven by the drive roller, which contacts the sheet and rotates to convey the sheet, so as to rotate and includes the support wall 23cc and the pressing portion 23, which are described above, the urging member 16 is applicable to any position.

While in the above-described embodiment the one regulating portion 24, which is located between the one extending portion 16a and the other extending portion 16b and contact both the one extending portion 16a and the other extending portion 16b, has been described as the regulating portion that regulates the position of the urging member 16, the regulating portion 24 is not limited to this. The regulating portion, which regulates the position of the urging member 16, may be constituted of two protruding portions. In this case, the two protruding portions are located between the one extending portion 16a and the other extending portion 16b such that the one protruding portion contacts the one extending portion 16a, and the other protruding portion contacts the other extending portion 16b.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A sheet conveyance apparatus comprising:
an inner main unit;
a guiding portion that is located opposed to the inner main unit and forms a conveyance path for sheets;
a conveyance roller pair that includes a drive roller and a driven roller, the driven roller being driven by the drive roller to rotate, the conveyance roller pair contacting a sheet and rotating to convey the sheet;
a mounting portion located in the guiding portion, the driven roller being mounted to the mounting portion; and
an urging member located in the mounting portion, the urging member urging the driven roller toward the drive roller; wherein
the driven roller includes a roller portion and a shaft portion, the roller portion contacting the sheet, the shaft portion projecting from both end surfaces of the roller portion;
the urging member is an approximately-U-shaped linear member and includes a pair of extending portions and a base end portion, the pair of extending portions extending in a conveyance direction of the sheet and abutting on the shaft portion, the base end portion connecting end portions of the pair of extending portions; and
the mounting portion includes
a pair of bearing portions that supports the shaft portion of the driven roller,
a supporting portion that is located on an upstream side or a downstream side in the conveyance direction in the pair of bearing portions and supports the pair of extending portions from below,
a pressing portion that abuts on the pair of extending portions, from above, between the pair of bearing portions and the supporting portion to elastically deform the pair of extending portions, and
a regulating portion that is located between the pair of bearing portions and the supporting portion in the conveyance direction and regulates an interval between the pair of extending portions such that the interval becomes wider than a length of the roller portion in a width direction.

2. The sheet conveyance apparatus according to claim 1, wherein distal ends of the pair of extending portions include bending portions bent toward a side opposite to an urging direction of the urging member.

3. The sheet conveyance apparatus according to claim 1, wherein:
the supporting portion projects from a base surface of the mounting portion and includes a support wall extending in the width direction;
the pressing portion includes a pair of opposed wall portions and protruding portions, the pair of opposed wall portions projecting from the base surface between the support wall and the regulating portion in the conveyance direction, the pair of opposed wall portions being mutually opposed in the width direction, the protruding portions projecting from the respective pair of opposed wall portions, the pair of extending portions abutting on the protruding portions; and
the protruding portions includes first abutting portions on which the pair of extending portions abut, the first abutting portions being located on the drive roller side with respect to a straight line connecting second abutting portions where the pair of extending portions abuts on the shaft portion to third abutting portions where the pair of extending portions abuts on the support wall.

4. The sheet conveyance apparatus according to claim 1, wherein the regulating portion is a plate-shaped material extending in the width direction, the regulating portion being located upright from the base surface of the mounting portion, the regulating portion having a length in the width direction larger than the length of the roller portion in the width direction.

5. An image forming apparatus comprising:
the sheet conveyance apparatus according to claim 1; and
an image forming unit that forms an image on the sheet.

* * * * *